United States Patent
Yamaguchi

[11] 4,101,203
[45] Jul. 18, 1978

[54] GAUSS TYPE LENS SYSTEM

[75] Inventor: Tamikazu Yamaguchi, Sakai, Japan

[73] Assignee: Minolta Camera Kabushiki Kaisha, Osaka, Japan

[21] Appl. No.: 757,213

[22] Filed: Jan. 6, 1977

[30] Foreign Application Priority Data

Jan. 12, 1976 [JP] Japan ............................ 51/3001

[51] Int. Cl.² ................................................ G02B 9/60
[52] U.S. Cl. ................................................ 350/217
[58] Field of Search ................................... 350/217

[56] References Cited

U.S. PATENT DOCUMENTS

| 2,735,339 | 2/1956 | Yoshikazu | 350/217 |
| 3,560,079 | 2/1971 | Wakimoto et al. | 350/217 |
| 3,617,111 | 11/1971 | Kawazu | 350/217 |
| 3,634,001 | 1/1972 | Shimada | 350/217 |
| 3,815,974 | 6/1974 | Momiyama | 350/217 |

Primary Examiner—Conrad J. Clark
Attorney, Agent, or Firm—Harold L. Jackson; Stanley R. Jones; Joseph W. Price

[57] ABSTRACT

An improved Gauss type lens system having a long back focal length with a relatively high aperture ratio is provided. The Gauss type lens system can comprise a five group, seven lens element system wherein the overall length of the lens system is less than 90 percent of its focal length. The Gauss type lens system has design parameters within the following ranges, wherein the sub-numbers refer to respective lens characteristics, sequentially measured from the object to image side:

$$1.7 < r_8/r_6 < 1.9, \quad (1)$$

$$0.9 < r_{10}/r_8 < 1.2, \quad (2)$$

$$0.67 < (d_6 + d_7)/(d_3 + d_4) < 0.87, \quad (3)$$

$$1.65 < n_2 < 1.72, \quad (4)$$

$$n_5 > 1.72, n_6 > 1.72 \quad (5)$$

wherein,
$r$ represents the radius of curvature;
$d$ represents the axial distance, and
$n$ represents the refractive index.

9 Claims, 5 Drawing Figures

FIG.1
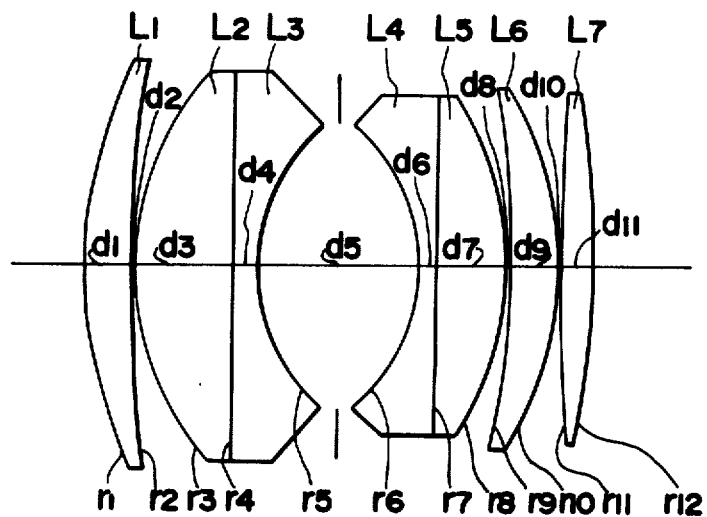
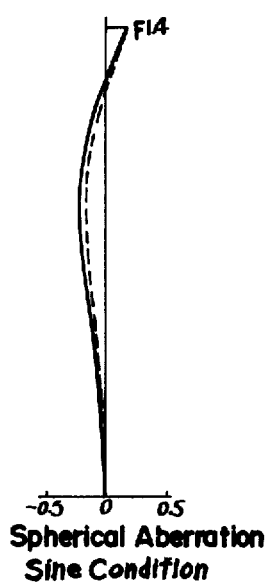
FIG.2a
Spherical Aberration
Sine Condition
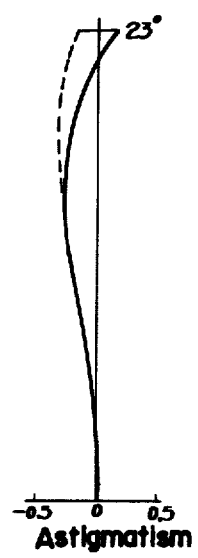
FIG.2b
Astigmatism
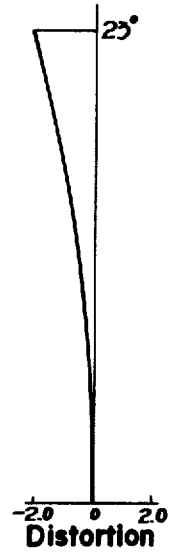
FIG.2c
Distortion Coma

GAUSS TYPE LENS SYSTEM

BACKGROUND OF THE INVENTION

1. Field of the Invention

The present invention relates generally to a Gauss type lens system and more particularly to an improved Gauss type lens system of relatively high aperture ratio and long back focal distance having a five group, seven lens element design of a relatively compact configuration.

2. Description of the Prior Art

As is known in the prior art, a Gauss type lens system of high aperture ratio and long back focal distance does not readily lend itself to the correction of spherical aberration, coma and astigmatism. Complicating the solution of these problems is the commercial demand to provide a shorter overall length to provide a general overall compactness. Any attempt, however, to reduce the overall length of such a Gauss type lens system necessarily results in a substantial increase in coma flare at intermediate field angles, thus impairing the image performance of the lens system.

Optical designers are well aware of the five group, seven lens element Gauss type lens system format. In this regard, it has been a conventional practice as can be seen from U.S. Pat. No. 3,560,079, to increase the thickness of the doublet, (third lens group consisting of the fourth and fifth lens elements), to thereby promote the divergence of the light ray pencil for the purpose of increasing the back focal distance of the overall lens system. Additionally, it has been recognized that to achieve a satisfactory correction of coma and astigmatism, there must be provided a sufficiently broad air space (accommodating the diaphragm) between the second lens group doublet and the third lens group doublet. A Gauss type lens system of this design can be seen in the U.S. Pat. No. 3,634,001. The teachings of these United States Patents, however, do not benefit an optical designer who wishes to reduce the overall length of the lens system to achieve a compact design. The lens design suggested in these references would, by virtue of just the marginal thicknesses of the individual lens groups that would be required for commercial manufacturing and processing, increase the overall length of the lens system thus making it extremely difficult to accomplish the highly desired compactness required.

Generally, a five group, seven lens element Gauss type lens system having a back focal distance greater than 70 percent of its focal length, a normal field angle (2ω) of about 46 degrees and an F number of about 1.4 must have an overall length in excess of 95 percent of the focal length of the lens system. It is not believed that any five group Gauss type lens system heretofore previously known, has an overall length shorter than 90 percent of the focal length of the lens system.

Any Gauss type lens system heretofore known by the present inventor having an overall length less than 90 percent of its focal length is of the six group, seven lens element type in which the normal second group (doublet) is split so that the second and third lens elements are separated into two individual lens elements with an air lens provided therebetween. The air lens being utilized to correct the coma flare. While this design is effective in correcting coma flare, it is difficult to reduce the Petzval sum to a sufficient satisfactory extent with a short overall length design. The resulting lens system suffers in that the flatness of the image plane is not maintained and the correction of lateral chromatic aberration is made difficult. From a practical viewpoint, the manufacturing tolerances, particularly as effected by an eccentric error sensitivity, is decreased by the separated second and third lens elements. Accordingly, the commercial product will have a greater variance in its performance between individual manufactured lens systems than would be the case with the more conventional five group, seven element lens system having the second and third element cemented together as a doublet.

Finally, there is still a demand in the prior art for an improved compact Gauss type lens system that can be relatively easily manufactured for commercial sale.

SUMMARY OF THE INVENTION

An object of the present invention is to provide an improved five group, seven lens element, Gauss type lens system having a relatively high aperture ratio, long back focal distance, high degree of correction of aberrations and being of a relatively compact configuration. The resulting improved Gauss type lens system has an overall length shorter than 90 percent of its focal length. This is accomplished with a five group, seven lens element Gauss type lens system utilizing from the object to image side, a first positive meniscus lens element, convex to the object side to form the first lens group; a second positive lens element and a third negative lens element cemented together to form a second lens group of a meniscus shaped doublet convex to the object side; a fourth negative lens element and a fifth positive lens element cemented together to form a third lens group having a meniscus shaped doublet concave to the object side; a sixth positive meniscus lens element concave to the object side forming the fourth lens group and finally, a seventh positive lens element forming the fifth lens group.

This improved Gauss type lens system has the following design parameters, wherein the sub-numbers refer to the consecutive lenses measured from the object to image side;

$$1.7 < r8/r6 < 1.9, \tag{1}$$

$$0.9 < r10/r8 < 1.2, \tag{2}$$

$$0.67 < (d_6 + d_7)/(d_3 + d_4) < 0.87, \tag{3}$$

$$1.65 < n_2 < 1.72, \tag{4}$$

$$n_5 > 1.72; n_6 > 1.72 \tag{5}$$

wherein, $r$ represents the radius of curvature;
$d$ represents the axial distance, and
$n$ represents the refractive index The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a schematic cross-sectional view of a preferred embodiment of the present invention;

FIGS. 2A, 2B and 2C are graphical plots of respectively spherical aberration and sign condition, astigmatism and distortion of the embodiment of FIG. 1.

BRIEF DESCRIPTION OF THE PREFERRED EMBODIMENTS

Figure 3:
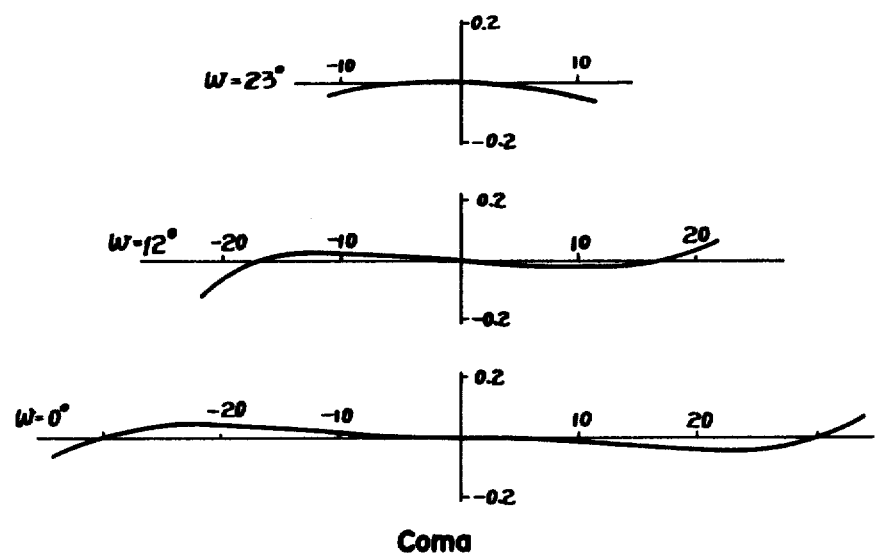
FIG. 3 are graphical plots of the coma of the embodiment of FIG. 1 shown at a field angle of $\omega = 23°$, $\omega = 12°$ and $\omega = 0°$.

The following description is provided to enable any person skilled in the optical art to make and use the present invention and sets forth the best modes contemplated by the inventor of carrying out his invention. Various modifications, however, will remain readily apparent to those skilled in the art, since the generic principles of the present invention have been defined herein specifically to provide a compact five group, seven lens element Gauss type lens system that can be readily manufactured.

The derivation of the specific lens assemblies parameters can be accomplished with the assistance of a computer. The present invention represents the parameters of a compromise balance of acceptable abberrations in a relatively easily manufactured Gauss type lens system that is suitable for use with a single lens reflex camera. The standards of acceptable aberrations are well-known in the optical field. The data presented herein in the Tables to be discussed subsequently, are more than adequate to permit a competent artisan in the optical art to reproduce embodiments of the present invention.

In the accompanying drawings, which supplement the following Tables, the lens system in accordance with the present invention, is illustrated schematically. As usual, in conventional lens diagrams, light is assumed to travel from left to right, and the individual lenses are designated by the letter, L, with a subscript indicating the position of the lenses as numbered consecutively from the object to image side. The radii of curvature of the lenses are indicated by the letter, r, with a subscript corresponding to the consecutive surfaces of the lens elements from left to right.

In the Tables, the minus signs indicate surfaces concave toward the object side, while the surfaces without a sign are convex toward the object side. The Tables also disclose the axial spacings by the letter, d. The value of the axial spacings between the lens elements are appropriately offset in the Tables to indicate their relative positions. All linear dimensions are given in absolute values with reference to an equivalent focal length $f = 100$. The Tables also provide, with respect to each example, the field angle, $2\omega$, the focal length, $f$, the F number, the refractive index, $n$, and the Abbe number, $\nu$.

Since only the dimensions vary in each of the embodiments described herein, FIG. 1 is deemed adequate for a representation of each of the improved Gauss type lens systems of the present invention.

The embodiments to be subsequently set forth were derived by rejecting the conventional Gauss type lens design techniques, such as narrowing the air space between the secondary group, L$_2$, L$_3$ (doublet) and the third group, L$_4$, L$_5$ (doublet) and further minimizing the thickness of the third lens group to thereby reduce the total or overall length of the lens systems. The resulting additional increment of positive refracting power occurring in the lens groups located on the object side of the diaphragm is taken care of by the tenth surface on lens element, L$_6$. This tenth surface design permits a divergence in the transmitted light ray pencil while permitting the back focal distance to be maintained at the desired design length of greater than seventy percent of the focal length.

Additionally, in accordance with the present invention, any increases in the various aberrations that would normally accompany such a design are compensated for as follows. The thickness of the second group is suitably made large in comparison with the thickness of the third lens group. The ratio of the radius of curvature of the eighth surface to that of the sixth surface is purposely increased beyond that of a conventional Gauss lens system while the ratio of the radius of curvature of the tenth surface to that of the eighth surface is decreased. Finally, relatively high refractive indices are selected for the fifth and sixth lens elements and the refractive index of the second lens element is purposely maintained lower than the indices of the fifth and sixth lens elements. It should be noted that the use of the more expensive higher indices glasses are limited to the smaller, volume-wise, lens elements.

Referring to FIG. 1 and more particularly to the lens elements from the object to image side of the diagram, a first positive meniscus lens element, L$_1$, is positioned convex to the object side and forms the first lens group. A second positive lens element, L$_2$, and a third negative lens element, L$_3$, are cemented together to form a second lens group of a meniscus shape, convex to the object side. A fourth negative lens element, L$_4$, and a fifth positive lens element, L$_5$, are cemented together to form a meniscus shaped doublet concave to the object side as the third lens group. A sixth positive meniscus shape lens element is positioned concave to the object side to form the fourth lens group while a seventh position lens element forms the fifth lens group. The improved Gauss lens system has been found to have the following design parameters:

$$1.7 < r8/r6 < 1.9, \qquad (1)$$

$$0.9 < r10/r8 < 1.2, \qquad (2)$$

$$0.67 < (d_6 + d_7)/(d_3 + d_4) < 0.87, \qquad (3)$$
$$1.65 < n_2 < 1.72, \qquad (4)$$
$$n_5 > 1.72, n_6 > 1.72 \qquad (5)$$

wherein, r represents the radius of curvature;

d represents the axial distance, and n represents the refractive index

With reference to the above ranges, conditions (1), (2), and (3) define a range in which the back focal distance can be increased while keeping the overall length as short as desirable and still permitting satisfactory correction of various aberrations. If either condition (1) or condition (2) are violated, then the correction of aberrations, such as spherical aberration and coma is extremely difficult. For example, if a lens system violates the upper limit of condition (1), and the lower limit of condition (2), it would be difficult to correct the coma flare. Likewise, if the lower limit of condition (1), and the upper limit of condition (2), were violated, it would not be possible to have an adequate long back focal distance. Condition (3) represents the relationship of the axial distances that are necessary to permit a shortening of the overall length and further to permit correction of coma flare and astigmatism. If the upper limit of condition (3) is exceeded, then the correction of coma flare is extremely difficult and the overall length of the lens system cannot be decreased. Violating the lower limit of condition (3) will result in increasing the positive refractive power in those lens groups rearwardly of the diaphragm to such an extent that it will not be possible to achieve a small Petzval sum and it will accordingly be extremely difficult to correct astigmatism.

Conditions (4) and (5) represent the balance of refractive power distribution required for a satisfactory correction of the various aberrations created in a Gauss type lens system. These conditions relate to the design parameters of lens element, $L_2$, that is utilized for providing the positive refractive power of the lens groups on the object side of the diaphragm and the lens elements, $L_5$ and $L_6$ which represent the positive refractive power of the lens groups on the image side of the diaphragm. It is necessary to adhere to condition (5) to prevent any increase in the Petzval sum that would otherwise be brought by the shortening of the overall length and further to permit astigmatism to be satisfactorily corrected. Condition (5) is also essential to the correction of spherical aberration and, along with condition (4) contributes to the correction of coma and distortion.

If the upper limit of condition (4) is exceeded, then the correction of coma and distortion is made extremely difficult while violating the lower limit will make it impossible to keep the Petzval sum small enough to insure satisfactory correction of the other aberrations, thus making it difficult to correct astigmatism.

The present invention provides a further advantage in that it permits a low cost Gauss type lens design since a less expensive grade of glass may be employed for the lenses which are comparatively of a large volume while the more expensive grade of glass can be utilized on the lenses having a comparatively small volume. The following Tables disclose three embodiments of the present invention.

Table 1

| Embodiment 1 | | $f = 100$  $1:1.4$  $2\omega = 46°$ | | |
|---|---|---|---|---|
| | Radius of Curvature | Axial Distance | Refractive Index | Abbe Number |
| $L_1$ | $r_1 = 85.953$ | | | |
| | | $d_1 = 7.427$ | $n_1 = 1.80741$ | $\nu_1 = 31.6$ |
| | $r_2 = 264.66$ | | | |
| | | $d_2 = 0.608$ | | |
| $L_2$ | $r_3 = 49.684$ | | | |
| | | $d_3 = 16.358$ | $n_2 = 1.689$ | $\nu_2 = 49.2$ |
| | $r_4 = -5214.5$ | | | |
| $L_3$ | | $d_4 = 3.916$ | $n_3 = 1.70055$ | $\nu_3 = 30.1$ |
| | $r_5 = 30.864$ | | | |
| | | $d_5 = 27.761$ | | |
| $L_4$ | $r_6 = -31.646$ | | | |
| | | $d_6 = 2.783$ | $n_4 = 1.74$ | $\nu_4 = 28.3$ |
| | $r_7 = \infty$ | | | |
| $L_5$ | | $d_7 = 11.931$ | $n_5 = 1.788$ | $\nu_5 = 45.7$ |
| | $r_8 = -56.734$ | | | |
| | | $d_8 = 0.293$ | | |
| $L_6$ | $r_9 = -176.34$ | | | |
| | | $d_9 = 8.627$ | $n_6 = 1.765$ | $\nu_6 = 46.3$ |
| | $r_{10} = -57.207$ | | | |
| | | $d_{10} = 0.303$ | | |
| $L_7$ | $r_{11} = 426.44$ | | | |
| | | $d_{11} = 5.201$ | $n_7 = 1.72$ | $\nu_7 = 50.2$ |
| | $r_{12} = -159.93$ | | | |

Back Focal Distance $f_b' = 72.05$
Total Length $L = 85.208$

Table 2

| Embodiment 2 | $f = 100$ | $1:1.4$  $2\omega = 46°$ | | |
|---|---|---|---|---|
| | Radius of Curvature | Axial Distance | Refractive Index | Abbe Number |
| $L_1$ | $r_1 = 83.858$ | | | |
| | | $d_1 = 7.722$ | $n_1 = 1.7545$ | $\nu_1 = 32.8$ |
| | $r_2 = 290.02$ | | | |
| | | $d_2 = 0.476$ | | |
| $L_2$ | $r_3 = 49.021$ | | | |
| | | $d_3 = 16.082$ | $n_2 = 1.7003$ | $\nu_2 = 47.7$ |
| | $r_4 = 1946.5$ | | | |
| $L_3$ | | $d_4 = 3.632$ | $n_3 = 1.71736$ | $\nu_3 = 29.4$ |
| | $r_5 = 30.975$ | | | |
| | | $d_5 = 27.862$ | | |
| $L_4$ | $r_6 = -31.524$ | | | |
| | | $d_6 = 2.511$ | $n_4 = 1.733$ | $\nu_4 = 28.2$ |
| | $r_7 = -1156.0$ | | | |
| $L_5$ | | $d_7 = 12.181$ | $n_5 = 1.7885$ | $\nu_5 = 45.7$ |
| | $r_8 = -56.457$ | | | |
| | | $d_8 = 0.293$ | | |
| $L_6$ | $r_9 = -155.81$ | | | |
| | | $d_9 = 8.755$ | $n_6 = 1.7885$ | $\nu_6 = 45.7$ |
| | $r_{10} = -56.490$ | | | |
| | | $d_{10} = 0.303$ | | |
| $L_7$ | $r_{11} = 346.23$ | | | |
| | | $d_{11} = 5.2$ | $n_7 = 1.72$ | $\nu_7 = 50.2$ |
| | $r_{12} = -181.72$ | | | |

Back Focal Distance $f_b' = 72.18$
Total Length $L = 85.017$

Table 3

| Embodiment 3 | | $f = 100$  $1:1.4$  $2\omega = 46°$ | | |
|---|---|---|---|---|
| | Radius of Curvature | Axial Distance | Refractive Index | Abbe Number |
| $L_1 \begin{bmatrix} \\ \\ \end{bmatrix}$ | $r_1 = 85.431$ | $d_1 = 7.382$ | $n_1 = 1.80741$ | $\nu_1 = 31.6$ |
| | $r_2 = 260.54$ | $d_2 = 0.628$ | | |
| $L_2$ | $r_3 = 50.166$ | $d_3 = 16.420$ | $n_2 = 1.689$ | $\nu_2 = 49.4$ |
| $L_3 \begin{bmatrix} \\ \\ \end{bmatrix}$ | $r_4 = \infty$ | $d_4 = 3.978$ | $n_3 = 1.70055$ | $\nu_3 = 30.1$ |
| | $r_5 = 30.901$ | $d_5 = 27.74$ | | |
| $L_4 \begin{bmatrix} \\ \\ \end{bmatrix}$ | $r_6 = -31.061$ | $d_6 = 2.825$ | $n_4 = 1.74$ | $\nu_4 = 28.3$ |
| $L_5$ | $r_7 = 3617.6$ | $d_7 = 11.966$ | $n_5 = 1.7885$ | $\nu_5 = 45.7$ |
| | $r_8 = -54.733$ | $d_8 = 0.293$ | | |
| $L_6 \begin{bmatrix} \\ \\ \end{bmatrix}$ | $r_9 = -180.60$ | $d_9 = 8.526$ | $n_6 = 1.765$ | $\nu_6 = 46.3$ |
| | $r_{10} = -57.156$ | $d_{10} = 0.303$ | | |
| $L_7 \begin{bmatrix} \\ \\ \end{bmatrix}$ | $r_{11} = 444.09$ | $d_{11} = 5.200$ | $n_7 = 1.717$ | $\nu_7 = 47.9$ |
| | $r_{12} = -167.97$ | | | |

Back Focal Distance $f_b' = 72.56$
Total Length $L = 85.261$

As noted earlier, FIG. 1 is a schematic view of the embodiment disclosed in Table 1 above. FIGS. 2A, 2B and 2C and FIG. 3 are respective graphical plots of various aberrations pertinent to the first embodiment. Additional figures were not deemed necessary to disclose the second and third embodiments since both the structure and aberrations of these embodiments are substantially similar to those of the first embodiment and an optical designer giving the values of the respective Tables 2 and 3 and the drawing could easily comprehend and reproduce these embodiments of the present invention.

Since an optical designer given the design parameters of the present invention, can comprehend both the significance and the possibility of creating modifications within the parameters of the present invention, it should be understood that the above examples are merely illustrative and accordingly the present invention should be measured solely from the following claims.

What is claimed is:

1. A five group, seven element Gauss type lens system comprising, from the object side to the image side of the lens system;

a first positive meniscus lens element convex to the object side, forming a first lens group;
   a second positive lens element;
   a third negative lens element cemented to the second lens element to form a meniscus-shaped doublet convex to the object side, forming a second lens group;
   a fourth negative lens element;
   a fifth positive lens element cemented to the fourth lens element to form a meniscus-shaped doublet concave to the object side, forming a third lens group;
   a sixth positive meniscus lens element concave to the object side, forming a fourth lens group; and
   a seventh positive lens element, forming a fifth lens group,
   the lens system having design parameters within the following ranges:

$1.7 < r8/r6 < 1.9$, $0.9 < r10/r8 < 1.2$, $0.67 < (d_6 + d_7)/(d_3 + d_4) < 0.87$, $1.65 < n2 < 1.72$, $n5 > 1.72; n6 > 1.72$ wherein,
   $r$ represents the radius of curvature,
   $d$ represents the value of the axial distance, and
   $n$ represents refractive index,
   the sub-numbers correspond to the consecutive values from the object to image side of the lens system.

2. The invention of claim 1 wherein the overall total length of the lens elements from object to image side of the lens system is shorter than 90 percent of the focal length of the lens system.

3. An improved Gauss type lens system having the following design parameters;

| | | $f = 100$  $1:1.4$  $2\omega = 46°$ | | |
|---|---|---|---|---|
| | Radius of Curvature | Axial Distance | Refractive Index | Abbe Number |
| $L_1 \begin{bmatrix} \\ \\ \end{bmatrix}$ | $r_1 = 85.953$ | $d_1 = 7.427$ | $n_1 = 1.80741$ | $\nu_1 = 31.6$ |
| | $r_2 = 264.66$ | $d_2 = 0.608$ | | |
| $L_2 \begin{bmatrix}$ | $r_3 = 49.684$ | $d_3 = 16.358$ | $n_2 = 1.689$ | $\nu_2 = 49.2$ |
| $L_3 \begin{bmatrix} \\ \\ \end{bmatrix}$ | $r_4 = -5214.5$ | $d_4 = 3.916$ | $n_3 = 1.70055$ | $\nu_3 = 30.1$ |
| | $r_5 = 30.864$ | $d_5 = 27.761$ | | |
| | $r_6 = -31.646$ | | | |

-continued

| | Radius of Curvature | Axial Distance | Refractive Index | Abbe Number |
|---|---|---|---|---|
| | | $f = 100 \quad 1:1.4 \quad 2\omega = 46°$ | | |
| $L_4$ | | $d_6 = 2.783$ | $n_4 = 1.74$ | $\nu_4 = 28.3$ |
| $L_5$ | $r_7 = \infty$ | $d_7 = 11.931$ | $n_5 = 1.788$ | $\nu_5 = 45.7$ |
| | $r_8 = -56.734$ | $d_8 = 0.293$ | | |
| $L_6$ | $r_9 = -176.34$ | $d_9 = 8.627$ | $n_6 = 1.765$ | $\nu_6 = 46.3$ |
| | $r_{10} = -57.207$ | $d_{10} = 0.303$ | | |
| $L_7$ | $r_{11} = 426.44$ | $d_{11} = 5.201$ | $n_7 = 1.72$ | $\nu_7 = 50.2$ |
| | $r_{12} = -159.93$ | | | |

Back Focal Distance $f_b' = 72.05$
Total Length $L = 85.208$.

4. An improved Gauss type lens system having the following design parameters;

| | Radius of Curvature | Axial Distance | Refractive Index | Abbe Number |
|---|---|---|---|---|
| | | $f = 100 \quad 1:1.4 \quad 2\omega = 46°$ | | |
| $L_1$ | $r_1 = 83.858$ | $d_1 = 7.722$ | $n_1 = 1.7545$ | $\nu_1 = 32.8$ |
| | $r_2 = 290.02$ | $d_2 = 0.476$ | | |
| $L_2$ | $r_3 = 49.021$ | $d_3 = 16.082$ | $n_2 = 1.7003$ | $\nu_2 = 47.7$ |
| $L_3$ | $r_4 = 1946.5$ | $d_4 = 3.632$ | $n_3 = 1.71736$ | $\nu_3 = 29.4$ |
| | $r_5 = 30.975$ | $d_5 = 27.862$ | | |
| $L_4$ | $r_6 = -31.524$ | $d_6 = 2.511$ | $n_4 = 1.733$ | $\nu_4 = 28.2$ |
| $L_5$ | $r_7 = -1156.0$ | $d_7 = 12.181$ | $n_5 = 1.7885$ | $\nu_5 = 45.7$ |
| | $r_8 = -56.457$ | $d_8 = 0.293$ | | |
| $L_6$ | $r_9 = -155.81$ | $d_9 = 8.755$ | $n_6 = 1.7885$ | $\nu_6 = 45.7$ |
| | $r_{10} = -56.490$ | $d_{10} = 0.303$ | | |
| $L_7$ | $r_{11} = 346.23$ | $d_{11} = 5.2$ | $n_7 = 1.72$ | $\nu_7 = 50.2$ |
| | $r_{12} = -181.72$ | | | |

Back Focal Distance $f_b' = 72.18$
Total Length $L = 85.017$.

5. An improved Guass type lens system having the following design parameters;

| | Radius of Curvature | Axial Distance | Refractive Index | Abbe Number |
|---|---|---|---|---|
| | | $f = 100 \quad 1:1.4 \quad 2\omega = 46°$ | | |
| $L_1$ | $r_1 = 85.431$ | $d_1 = 7.382$ | $n_1 = 1.80741$ | $\nu_1 = 31.6$ |
| | $r_2 = 260.54$ | $d_2 = 0.628$ | | |
| $L_2$ | $r_3 = 50.166$ | $d_3 = 16.420$ | $n_2 = 1.689$ | $\nu_2 = 49.4$ |
| $L_3$ | $r_4 = \infty$ | $d_4 = 3.978$ | $n_3 = 1.70055$ | $\nu_3 = 30.1$ |
| | $r_5 = 30.901$ | $d_5 = 27.74$ | | |
| $L_4$ | $r_6 = -31.061$ | $d_6 = 2.825$ | $n_4 = 1.74$ | $\nu_4 = 28.3$ |
| $L_5$ | $r_7 = 3617.6$ | $d_7 = 11.966$ | $n_5 = 1.7885$ | $\nu_5 = 45.7$ |
| | $r_8 = -54.733$ | $d_8 = 0.293$ | | |
| $L_6$ | $r_9 = -180.60$ | $d_9 = 8.526$ | $n_6 = 1.765$ | $\nu_6 = 46.3$ |
| | $r_{10} = -57.156$ | $d_{10} = 0.303$ | | |
| $L_7$ | $r_{11} = 444.09$ | $d_{11} = 5.200$ | $n_7 = 1.717$ | $\nu_7 = 47.9$ |
| | $r_{12} = -167.97$ | | | |

Back Focal Distance $f_b' = 72.56$
Total Length $L = 85.261$.

6. An improved Gauss type lens system having a back focal distance greater than 70 percent of its focal length, a field angle of approximately 46 degrees and an F number of approximately 1.4, consisting of, from the object to image side of the lens system;
- a first positive meniscus lens element convex to the object side;
- a second meniscus shaped doublet lens element convex to the object side;
- a third meniscus shaped doublet lens element concave to the object side;
- a fourth positive meniscus lens element concave to the object side, and
- a fifth positive lens element, the overall total length of the lens elements from object to image side of the lens system being shorter than ninety percent of the focal length of the lens system, the lens system having the following design parameters:

$$1.7 < r8/r6 < 1.9, \quad (1)$$

$$0.9 < r10/r8 < 1.2 \quad (2)$$

$$0.67 < (d_6 + d_7)/(d_3 + d_4) < 0.87 \quad (3)$$

wherein,
- $r$ represents the radius of curvature; and
- $d$ represents the axial distance,
- the respective sub-numbers representing the consecutive lens characteristics from the object to the image side.

7. The invention of claim 6 wherein the fifth positive lens element has an object and image side radius of curvature, $r_{11}$, and $r_{12}$ respectively, the absolute value of $r_{11}$ being greater than $r_{12}$.

8. The invention of claim 6 further including the following design parameters;

$$1.65 < n_2 < 1.72 \quad (4)$$
$$n_3 > 1.72, n_6 > 1.72 \quad (5)$$

wherein $n$ represents the refractive index.

9. The invention of claim 6 wherein the refractive index of the fourth positive lens element is greater than 1.72.